United States Patent
Ho et al.

(10) Patent No.: US 10,671,177 B1
(45) Date of Patent: Jun. 2, 2020

(54) BACKLIGHT MODULE

(71) Applicant: CHICONY POWER TECHNOLOGY CO., LTD., New Taipei (TW)

(72) Inventors: Hsuan-Wei Ho, New Taipei (TW); Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/511,558

(22) Filed: Jul. 15, 2019

(30) Foreign Application Priority Data

Feb. 27, 2019 (TW) .............................. 108106899 A (51) Int. Cl.
*G06F 3/02* (2006.01)
*F21V 8/00* (2006.01)

(52) U.S. Cl.
CPC ......... *G06F 3/0202* (2013.01); *G02B 6/0055* (2013.01)

(58) Field of Classification Search
CPC ............................. G06F 3/0202; G02B 6/0055
See application file for complete search history.

(56) References Cited

U.S. PATENT DOCUMENTS

| | | | | |
|---|---|---|---|---|
| 2014/0218890 A1* | 8/2014 | Wang | ............... | G02B 6/0055 362/23.03 |
| 2014/0369067 A1* | 12/2014 | Chen | ............... | G02B 6/0021 362/606 |
| 2015/0198302 A1* | 7/2015 | Liang | ............... | H01H 9/182 362/23.03 |
| 2016/0097896 A1* | 4/2016 | Liang | ............... | H01H 13/83 362/23.03 |

FOREIGN PATENT DOCUMENTS

| | | | | |
|---|---|---|---|---|
| CN | 104576145 A | 4/2015 | | |
| CN | 104795267 A | 7/2015 | | |
| CN | 205564608 | * 1/2016 | ........... | G06F 3/0202 |
| CN | 205564608 U | 9/2016 | | |
| CN | 107768171 A | 3/2018 | | |
| TW | M446364 U | 2/2013 | | |
| TW | 201503195 A | 1/2015 | | |
| TW | M519764 U | 4/2016 | | |
| TW | I590279 B | 7/2017 | | |
| TW | I604492 B | 11/2017 | | |

* cited by examiner

*Primary Examiner* — Donald L Raleigh
(74) *Attorney, Agent, or Firm* — Muncy, Geissler, Olds & Lowe, P.C.

(57) ABSTRACT

A backlight module includes a light blocking plate, a light guiding plate, a reflector, a circuit board, a flexible circuit board and a conductive connection element. The light blocking plate is disposed below a keyboard component and includes an emission zone. The light guiding plate is disposed below the light blocking plate and includes a hollowed-out portion. The reflector is disposed below the light guiding plate and includes a through hole. The through hole corresponds in position to the hollowed-out portion. The circuit board is disposed below the reflector. A light-emitting component is disposed on the circuit board. The flexible circuit board is disposed below the reflector which separates the flexible circuit board and the light guiding plate. The conductive connection element is disposed on the circuit board, penetratingly disposed at the hollowed-out portion and the through hole, and connected to the circuit board and the flexible circuit board.

20 Claims, 6 Drawing Sheets

BACKLIGHT MODULE

BACKGROUND OF THE INVENTION

Field of the Invention

The present disclosure relates to backlight modules and, more particularly, to a low-cost backlight module which has high structural strength, is highly antistatic, and is thin.

Description of the Prior Art

Conventional keyboards usually have a plain, functional appearance. As a result, manufacturers have developed a light-emitting keyboard which is visually pleasing. The light-emitting keyboard has a backlight module. The backlight module comprises light-emitting circuit boards, each characterized by a flexible circuit strip soldered to a flexible material circuit board or a rigid material circuit board. The circuit boards each have light-emitting diodes. The flexible circuit strip is connected to a power source to transmit power to the circuit boards. Those light-emitting diodes which receive power emit light from within the light-emitting keyboard such that the light-emitting keyboard is visually pleasing.

However, flexible material circuit boards incur high costs, and the soldered junction of each flexible circuit strip and respective flexible material circuit board is exposed and therefore are likely to be severed under external force. They are also susceptible to static electricity, to the detriment of the operation of the flexible circuit strip. Furthermore, if the flexible circuit strip is soldered to the rigid material circuit board, its size will be significantly increased and thereby affect the overall volume of the light-emitting keyboard.

Therefore, it is necessary to provide a low-cost backlight module which has high structural strength, is highly antistatic, and is thin.

SUMMARY OF THE INVENTION

It is an objective of the present disclosure to provide a low-cost backlight module which has high structural strength, is highly antistatic, and is thin.

In order to achieve the above and other objectives, the present disclosure provides a backlight module for use with a light-emitting keyboard. The light-emitting keyboard comprises a keyboard component and a light-emitting component. The backlight module comprises a light blocking plate, a light guiding plate, a reflector, a circuit board, a flexible circuit board and a conductive connection element. The light blocking plate is disposed below the keyboard component. The light blocking plate comprises an emission zone. The light guiding plate is disposed below the light blocking plate. The light guiding plate comprises a hollowed-out portion. The reflector is disposed below the light guiding plate. The reflector comprises a through hole. The through hole corresponds in position to the hollowed-out portion. The circuit board is disposed below the reflector. The light-emitting component is disposed on the circuit board. The flexible circuit board is disposed below the reflector. The reflector is disposed to separate the flexible circuit board and the light guiding plate. The conductive connection element is disposed on the circuit board, penetratingly disposed at the hollowed-out portion and the through hole, and connected to the circuit board and the flexible circuit board. Light emitted by the light-emitting component illuminates the keyboard component through the emission zone.

In an embodiment of the present disclosure, the through hole has a through hole width, the hollowed-out portion has a hollowed-out portion width, and the through hole width is less than the hollowed-out portion width.

In an embodiment of the present disclosure, an edge of the reflector and an edge of the light blocking plate are adhered together.

In an embodiment of the present disclosure, a maximum width of the conductive connection element is less than a minimum width of the hollowed-out portion.

In an embodiment of the present disclosure, the flexible circuit board further has an end portion electrically connected to the conductive connection element and partially received in the hollowed-out portion.

In an embodiment of the present disclosure, a width of the through hole is equal to a width of the conductive connection element.

In an embodiment of the present disclosure, the light guiding plate further comprises a receiving groove for receiving and limiting the movement of the flexible circuit board.

In an embodiment of the present disclosure, the light blocking plate further comprises a light blocking zone and a light blocking element disposed within the light blocking zone, and the light blocking zone corresponds in position to the conductive connection element.

In an embodiment of the present disclosure, the conductive connection element is formed by a reflow soldering process.

In an embodiment of the present disclosure, the hollowed-out portion has a contour of a four-pointed star.

DETAILED DESCRIPTION OF THE EMBODIMENTS

Figure 1:
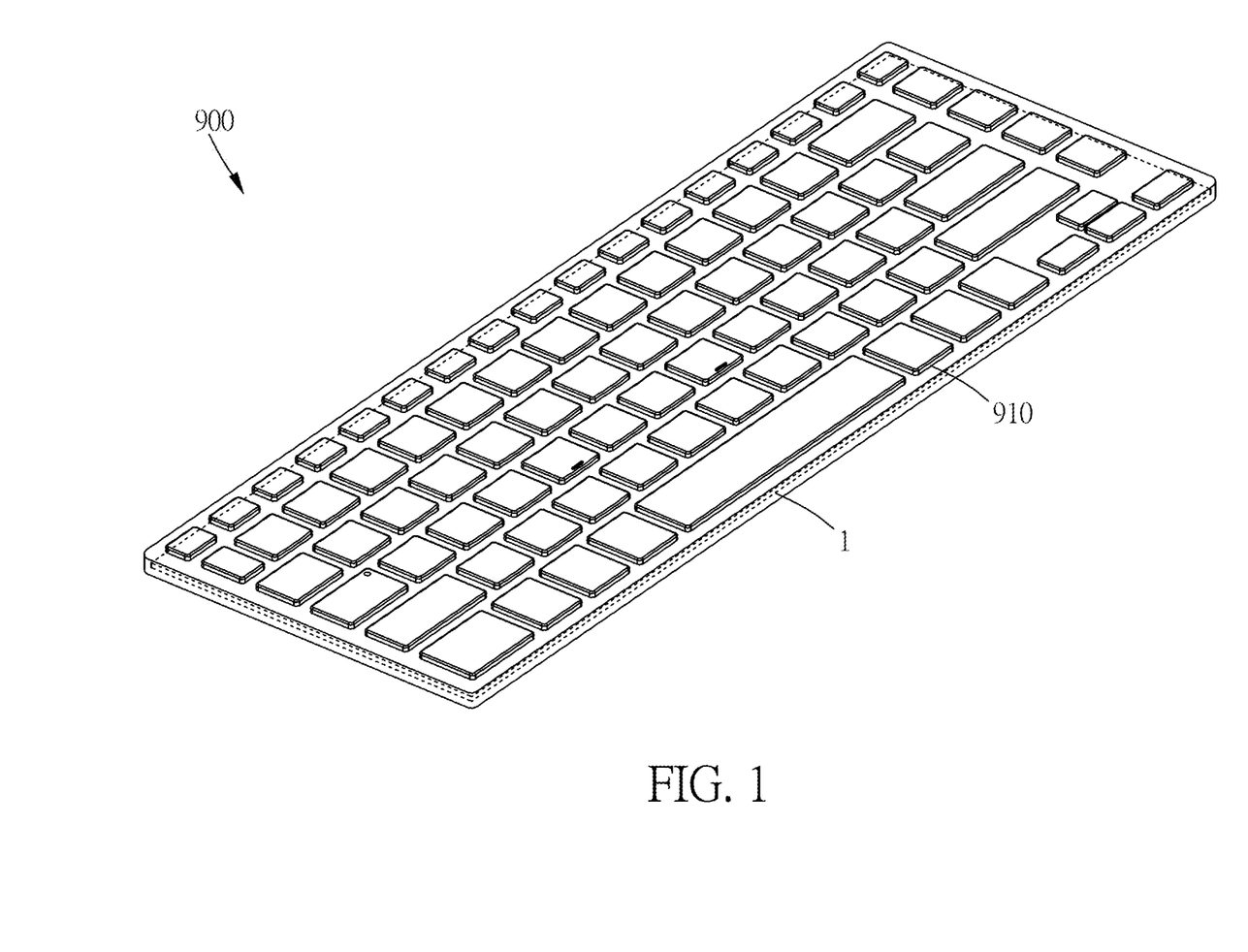
FIG. 1 is a schematic view of a light-emitting keyboard according to the first embodiment of the present disclosure.
Figure 2:
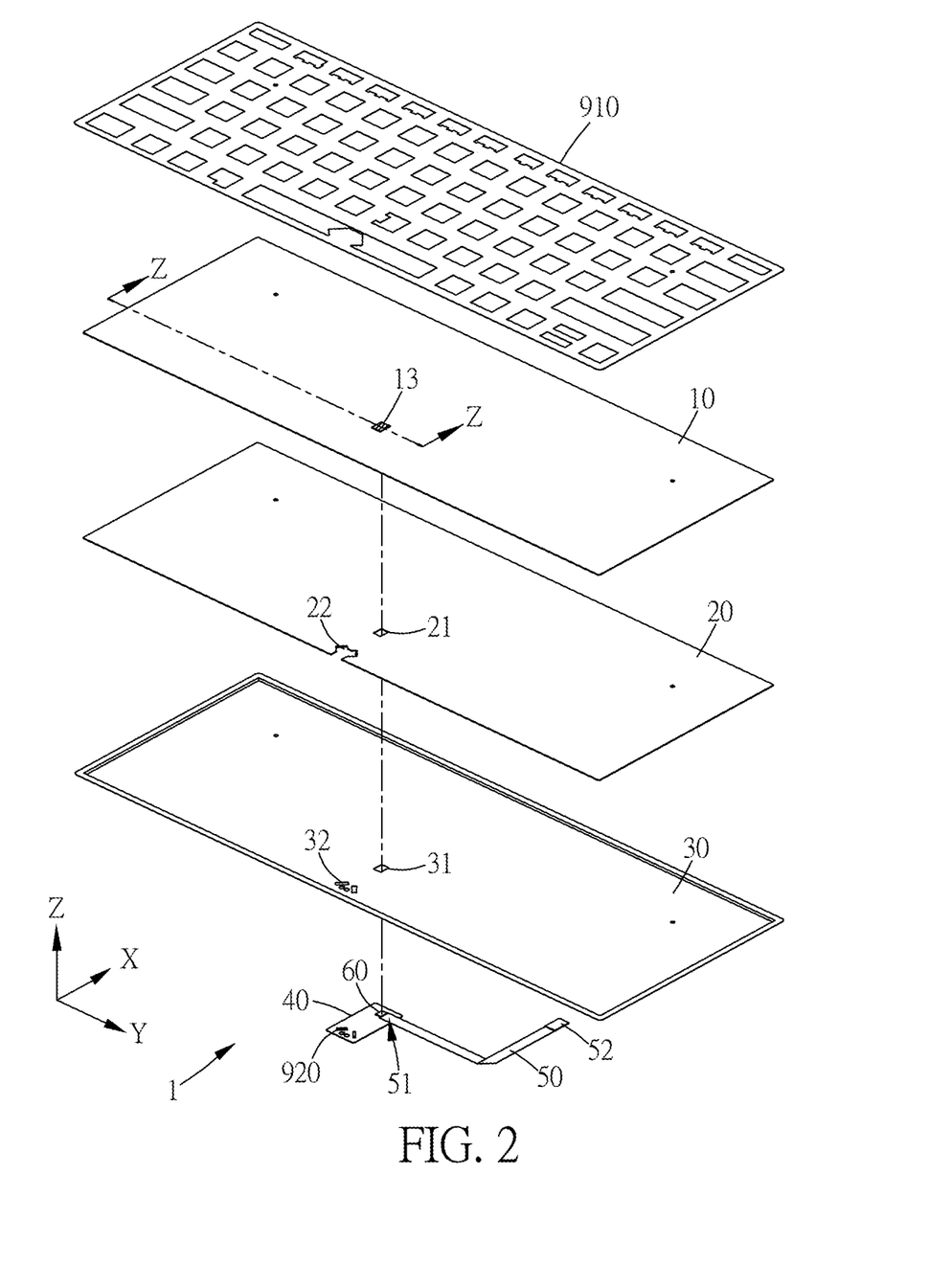
FIG. 2 is an exploded view of a keyboard component, a light-emitting component and a backlight module according to the first embodiment of the present disclosure.
Figure 3:
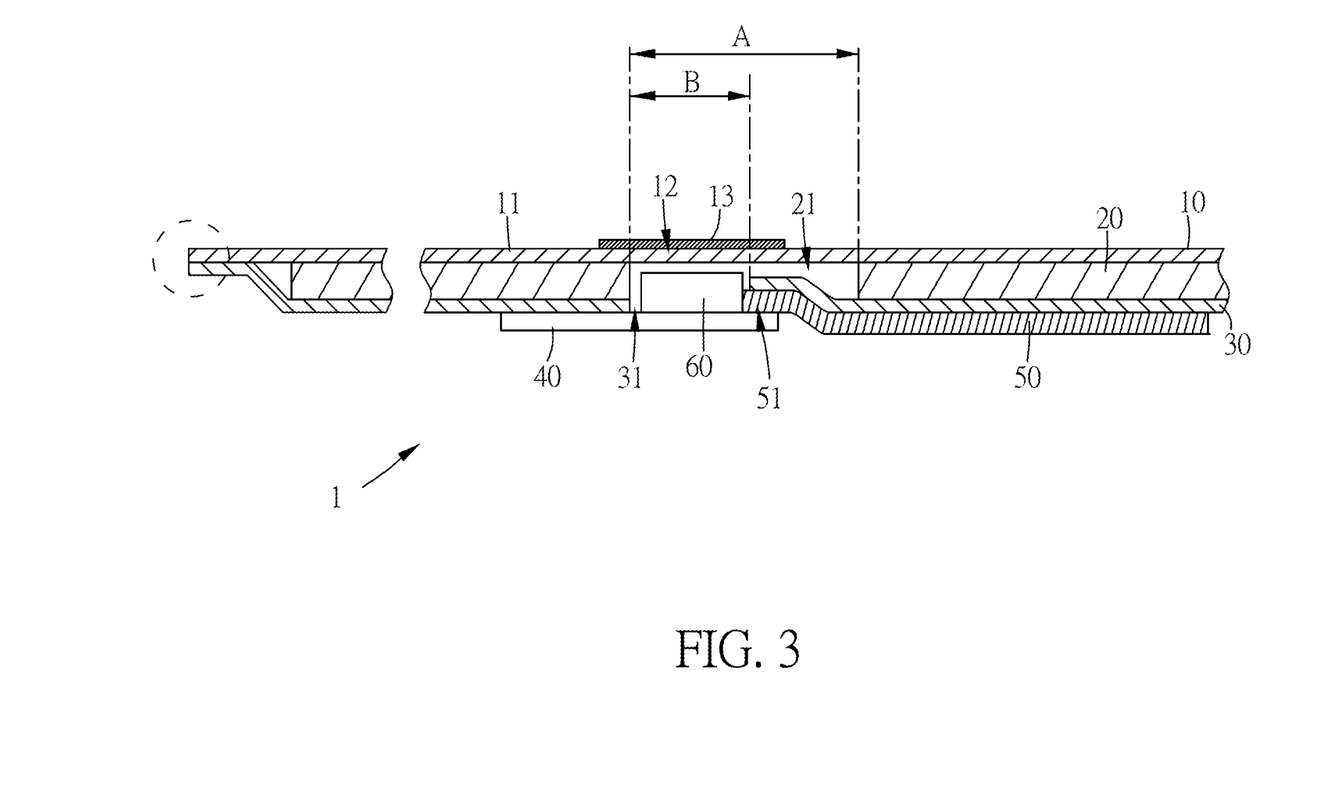
FIG. 3 is a cross-sectional view of the backlight module taken along line ZZ of FIG. 2 according to the first embodiment of the present disclosure.
Figure 4:
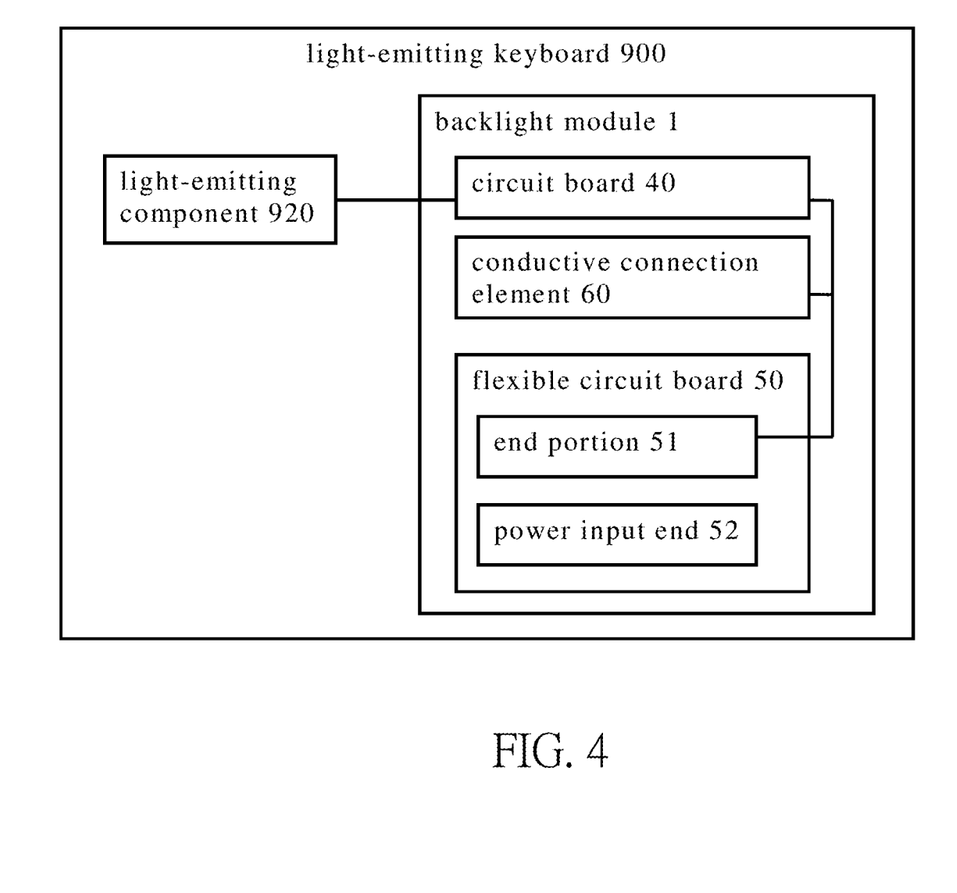
FIG. 4 is a block diagram of the light-emitting keyboard according to the first embodiment of the present disclosure.

Referring to FIG. 1 through FIG. 4, a light-emitting keyboard and a backlight module are provided according to the first embodiment of the present disclosure. FIG. 1 is a schematic view of a light-emitting keyboard according to the first embodiment of the present disclosure. FIG. 2 is an exploded view of a keyboard component, a light-emitting component and a backlight module according to the first embodiment of the present disclosure. FIG. 3 is a cross-sectional view of the backlight module taken along line ZZ of FIG. 2 according to the first embodiment of the present disclosure. FIG. 4 is a block diagram of the light-emitting keyboard according to the first embodiment of the present disclosure.

In the first embodiment of the present disclosure, as shown in FIG. 1 and FIG. 2, a light-emitting keyboard 900 is a keyboard with low cost which is capable of emitting light, has high structural strength, is highly antistatic, and is thin. The light-emitting keyboard 900 comprises a keyboard component 910, a light-emitting component 920 and a backlight module 1. The keyboard component 910 is a key sensing board for sensing pressure applied on different keys by a user to trigger commands. The light-emitting component 920 is a light-emitting diode disposed on the backlight module 1. The light-emitting component 920 emits light.

In the first embodiment of the present disclosure, the backlight module 1 provides sufficiently bright, uniformly distributed light. The backlight module 1 is disposed below the keyboard component 910. The backlight module 1 comprises a light blocking plate 10, a light guiding plate 20, a reflector 30, a circuit board 40, a flexible circuit board 50 and a conductive connection element 60.

In the first embodiment of the present disclosure, as shown in FIG. 2 and FIG. 3, the light blocking plate 10 is disposed below the keyboard component 910. The light blocking plate 10 blocks part of the light but is penetrable by the other part of the light and thereby defines the direction to which the light is emitted outward. The light blocking plate 10 comprises an emission zone 11, a light blocking zone 12 and a light blocking element 13. The light blocking element 13 is, for example, a black ink ribbon or black ink and is disposed within the light blocking zone 12 to block the light emitted from the light blocking zone 12. In a preferred embodiment, the light blocking zone 12 in under the space bar or under the center of each keycap of the keyboard component 910. The light blocking zone 12 corresponds in position to the conductive connection element 60. An emission zone 11, which is a light-penetrable zone free of the light blocking element 13, allows the light to be emitted to the keyboard component 910. Because the light blocking plate 10 is not bored in its entirety, static electricity generated as a result of rubbing the keys of the keyboard component 910 when typing is blocked to protect the other electronic components and the conductive connection element 60 below the light blocking plate 10. Furthermore, the light guiding plate 20 has a bored structure which might cause leakage of light and thereby deteriorate the uniformity of illuminance of the keys of the keyboard component 910, and in consequence, the light blocking zone 12 is designed to ensure satisfactory uniformity of illuminance.

In the first embodiment of the present disclosure, the light guiding plate 20 is disposed below the light blocking plate 10. The light guiding plate 20 not only guides but also uniformly distributes the light emitted by the light-emitting component 920. The light guiding plate 20 comprises a hollowed-out portion 21 and a light guiding plate emission hole 22. The hollowed-out portion 21 is cube-shaped and has a hollowed-out portion width A. The conductive connection element 60 is penetratingly disposed at the hollowed-out portion 21. The light guiding plate emission hole 22 corresponds in position to the light-emitting component 920. The light guiding plate emission hole 22 receives light emitted by the light-emitting component 920 such that the light is uniformly distributed while transmitted in the light blocking plate 10.

In the first embodiment of the present disclosure, the reflector 30 is disposed below the light guiding plate 20. The light emitted by the light-emitting component 920 is reflected off the reflector 30 and thereby back into the light guiding plate 20. The reflector 30 comprises a through hole 31 and a reflector emission hole 32. The through hole 31 is cube-shaped and corresponds in position to the hollowed-out portion 21. The conductive connection element 60 is penetratingly disposed at the through hole 31. The hollowed-out portion 21 and the through hole 31 together form a receiving space for receiving the conductive connection element 60. The through hole 31 has a through hole width B. The through hole width B is less than the hollowed-out portion width A. Therefore, the reflector 30 is slightly greater in length than the light guiding plate 20 along line ZZ of FIG. 2; hence, the reflector 30 prevents the light from leaking out of the hollowed-out portion 21 and falling on the bottom of the light-emitting keyboard 900. The edge of the reflector 30 and the edge of the light blocking plate 10 are adhered together (indicated by the circle on the left side of FIG. 3). Since the reflector 30 and the light blocking plate 10 are adhered together, a limitation is placed on the position of the light guiding plate 20 between the reflector 30 and the light blocking plate 10 to prevent the light guiding plate 20 from moving horizontally.

In the first embodiment of the present disclosure, as shown in FIG. 2 through FIG. 4, the circuit board 40 is made of a rigid material, such as PCB, and disposed below the reflector 30. The light-emitting component 920 is disposed on the circuit board 40. The circuit board 40 receives power from the flexible circuit board 50 and transmits the power to the light-emitting component 920 such that the light-emitting component 920 emits light. Because the circuit board 40 is made of a rigid material, production and assembly costs of the circuit board 40 are lower than those of flexible circuit boards.

In the first embodiment of the present disclosure, the flexible circuit board 50 is a strip-like circuit made of a flexible material, such as FPC. The flexible circuit board 50 is disposed below the reflector 30. The reflector 30 is disposed to separate the flexible circuit board 50 and the light guiding plate 20. Therefore, burrs on the surface of the light guiding plate 20 are unlikely to scratch the flexible circuit board 50, so the circuit of the flexible circuit board 50 is thereby protected. The reflector 30 blocks both static electricity at the system end and heat generated by an operating chip so as to improve the reliability of the keyboard.

The flexible circuit board 50 has an end portion 51 and a power input end 52. The end portion 51 and the power input end 52 are disposed at two ends of the strip-like circuit of the flexible circuit board 50, respectively. The end portion 51 is electrically connected to the conductive connection element 60. The end portion 51 is partially received in the hollowed-out portion 21. The power input end 52 receives power from a power source and then transmits the power to the conductive connection element 60. The end portion 51 of the flexible circuit board 50 is slightly elevated at the hollowed-out portion 21. The upper and lower surfaces of the end portion 51 are engaged fixedly between the reflector 30 and the circuit board 40. The cube-shaped hollowed-out portion 21 places a limitation on the position of the end portion 51; hence, a limitation is placed on the movement of the flexible circuit board 50 in X-direction and Y-direction.

In the first embodiment of the present disclosure, the conductive connection element 60 is solder joint. The conductive connection element 60 is formed and disposed on the circuit board 40 by reflow soldering and penetratingly disposed at the hollowed-out portion 21 and the through hole 31. The maximum width of the conductive connection element 60 is less than the minimum width of the hollowed-out portion 21. The width of the through hole 31 is substantially equal to the width of the conductive connection element 60. Therefore, the conductive connection element 60 can be received in the overlapped hollowed-out portion 21 and the through hole 31. The conductive connection element 60 is connected to the circuit board 40 and the end portion 51 of the flexible circuit board 50. The conductive connection element 60 transmits to the circuit board 40 the power from the flexible circuit board 50 such that the light-emitting component 920 disposed on the circuit board 40 emits light. Therefore, after receiving the power, the light-emitting component 920 can emit light, and the light passes through the reflector emission hole 32, the light guiding plate emission hole 22, the light guiding plate 20 and the emission zone 11 so as to illuminate the keyboard component 910. The conductive connection element 60 is received in the overlapped hollowed-out portion 21 and the through hole 31 and therefore contributes no extra thickness, thereby minimizing the thickness of the backlight module 1. The conductive connection element 60 in the overlapped hollowed-out portion 21 and the through hole 31 is protected by the light guiding plate 20 and the reflector 30 and therefore is not in direct contact with any external object. Therefore, the backlight module has high structural strength.

Referring to FIG. 2 and FIG. 3, to assemble the light-emitting keyboard 900, an assembly worker mounts the light-emitting component 920 on the circuit board 40 by a pick-and-place process. Afterward, the assembly worker places the end portion 51 of the flexible circuit board 50 on the circuit board 40 and then forms the solder joint at the junction of the end portion 51 and the circuit board 40 by a reflow soldering process such that the end portion 51 and the circuit board 40 are connected by the conductive connection element 60. Afterward, the assembly worker connects the power input end 52 of the flexible circuit board 50 to a power source (not shown). Subsequently, the assembly worker places the reflector 30 on the circuit board 40, causes the conductive connection element 60 to be penetratingly disposed at the through hole 31, and causes the light-emitting component 920 to be penetratingly disposed at the reflector emission hole 32. Afterward, the assembly worker places the light guiding plate 20 on the reflector 30, causes the hollowed-out portion 21 and the through hole 31 to overlap, causes the conductive connection element 60 to be penetratingly disposed at the hollowed-out portion 21, and causes the light-emitting component 920 to be penetratingly disposed at the light guiding plate emission hole 22. Afterward, the assembly worker places the light blocking plate 10 on the light guiding plate 20 and causes the light blocking element 13 to cover the conductive connection element 60. At this point in time, the assembly of the backlight module 1 is completed. Finally, the assembly worker places the keyboard component 910 on the backlight module 1 and puts the keyboard component 910 and the backlight module 1 in the casing of the keyboard, thereby finalizing the assembly of the light-emitting keyboard 900.

Figure 5:
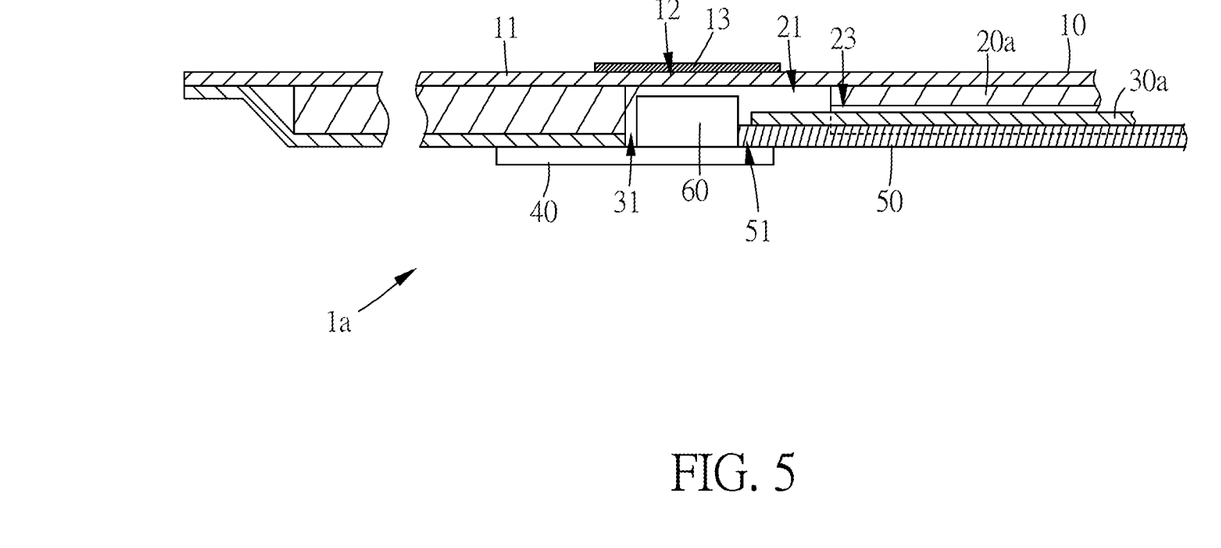
FIG. 5 is a cross-sectional view of the backlight module taken along line ZZ of FIG. 2 according to the second embodiment of the present disclosure.

Referring to FIG. 5, a light-emitting keyboard and a backlight module are provided according to the second embodiment of the present disclosure. FIG. 5 is a cross-sectional view of the backlight module taken along line ZZ of FIG. 2 according to the second embodiment of the present disclosure.

Referring to FIG. 5, the second embodiment is distinct from the first embodiment in that, in the second embodiment, a light guiding plate 20a of a backlight module 1a further comprises a strip-like receiving groove 23. The receiving groove 23 corresponds in shape and size to the flexible circuit board 50 and a portion of a reflector 30a. The receiving groove 23 receives the portion of the reflector 30a. The receiving groove 23 also receives and places a limitation on the position of the flexible circuit board 50 such that it is difficult for the flexible circuit board 50 to move in X-direction or Y-direction, thereby augmenting the limitation placed on the position of the flexible circuit board 50.

Figure 6:
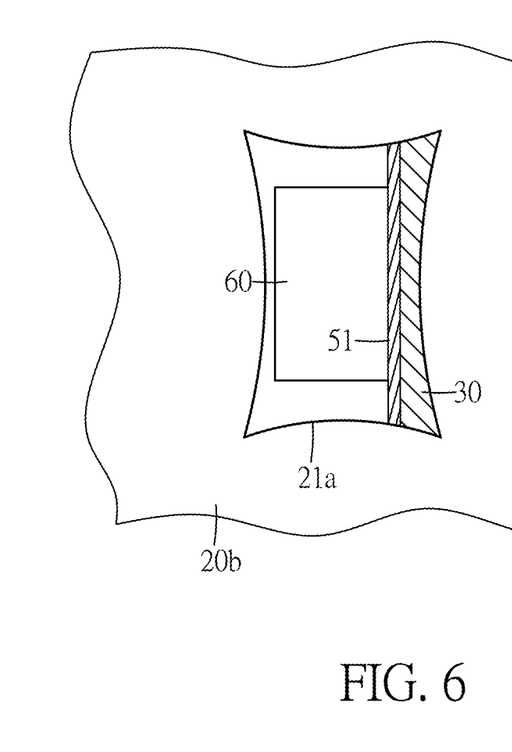
FIG. 6 is a partial schematic view of the backlight module according to the third embodiment of the present disclosure.

Referring to FIG. 6, a light-emitting keyboard and a backlight module are provided according to the third embodiment of the present disclosure. FIG. 6 is a partial schematic view of the backlight module according to the third embodiment of the present disclosure.

Referring to FIG. 6, the third embodiment is distinct from the first embodiment in that, in the third embodiment, a hollowed-out portion 21a of a light guiding plate 20b has a contour of a four-pointed star. It is only when the angle of incidence of light is less than a specific degree that the light propagating within the light guiding plate 20b penetrates through the contour into the hollowed-out portion 21a. Therefore, the curved contour of the hollowed-out portion 21a increases the likelihood that the angle of incidence will be greater than a specific degree whenever the light randomly transmitted to the contour of the hollowed-out portion 21a. Therefore, the light propagating within the light guiding plate 20b is prevented from leaking out to the hollowed-out portion 21a.

The light-emitting keyboard and the backlight module of the present disclosure are effective in improving the backlight module by cutting its production and assembly costs, reinforcing its structural strength, rendering it highly anti-static and highly resistant to high temperature, rendering it thin, preventing it from leaking light, ensuring satisfactory uniformity of illuminance of the keys, placing a limitation on the movement of a flexible circuit board, and protecting the flexible circuit board against scratches caused by burrs.

What is claimed is:

1. A backlight module, applied to a light-emitting keyboard, wherein the light-emitting keyboard comprises a keyboard component and a light-emitting component, the backlight module comprising:
   a light blocking plate disposed below the keyboard component and comprising an emission zone;
   a light guiding plate disposed below the light blocking plate and comprising a hollowed-out portion;
   a reflector disposed below the light guiding plate and comprising a through hole corresponding in position to the hollowed-out portion;
   a circuit board disposed below the reflector, wherein the light-emitting component is disposed on the circuit board;
   a flexible circuit board disposed below the reflector, wherein the reflector is disposed to separate the flexible circuit board and the light guiding plate; and
   a conductive connection element disposed on the circuit board, penetratingly disposed at the hollowed-out portion and the through hole, and connected to the circuit board and the flexible circuit board,
   wherein light emitted by the light-emitting component illuminates the keyboard component through the emission zone.

2. The backlight module as claimed in claim 1, wherein the through hole has a through hole width, the hollowed-out portion has a hollowed-out portion width, and the through hole width is less than the hollowed-out portion width.

3. The backlight module as claimed in claim 1, wherein an edge of the reflector and an edge of the light blocking plate are adhered together.

4. The backlight module as claimed in claim 1, wherein a maximum width of the conductive connection element is less than a minimum width of the hollowed-out portion.

5. The backlight module as claimed in claim 4, wherein the flexible circuit board further has an end portion electrically connected to the conductive connection element and partially received in the hollowed-out portion.

6. The backlight module as claimed in claim 4, wherein a width of the through hole is equal to a width of the conductive connection element.

7. The backlight module as claimed in claim 1, wherein the light guiding plate further comprises a receiving groove for receiving and limiting a movement of the flexible circuit board.

8. The backlight module as claimed in claim 1, wherein the light blocking plate further comprises a light blocking zone and a light blocking element disposed within the light blocking zone, and the light blocking zone corresponds in position to the conductive connection element.

9. The backlight module as claimed in claim 1, wherein the conductive connection element is formed by a reflow soldering process.

10. The backlight module as claimed in claim 1, wherein the hollowed-out portion has a contour of a four-pointed star.

11. A light-emitting keyboard, comprising:
a keyboard component;
a light-emitting component; and
a backlight module disposed below the keyboard component, the backlight module comprising:
a light blocking plate disposed below the keyboard component and comprising an emission zone;
a light guiding plate disposed below the light blocking plate and comprising a hollowed-out portion;
a reflector disposed below the light guiding plate and comprising a through hole corresponding in position to the hollowed-out portion;
a circuit board disposed below the reflector, wherein the light-emitting component is disposed on the circuit board;
a flexible circuit board disposed below the reflector, wherein the reflector is disposed to separate the flexible circuit board and the light guiding plate; and
a conductive connection element disposed on the circuit board, penetratingly disposed at the hollowed-out portion and the through hole, and connected to the circuit board and the flexible circuit board,
wherein light emitted by the light-emitting component illuminates the keyboard component through the emission zone.

12. The light-emitting keyboard as claimed in claim 11, wherein the through hole has a through hole width, the hollowed-out portion has a hollowed-out portion width, and the through hole width is less than the hollowed-out portion width.

13. The light-emitting keyboard as claimed in claim 11, wherein an edge of the reflector and an edge of the light blocking plate are adhered together.

14. The light-emitting keyboard as claimed in claim 11, wherein a maximum width of the conductive connection element is less than a minimum width of the hollowed-out portion.

15. The light-emitting keyboard as claimed in claim 14, wherein the flexible circuit board further has an end portion electrically connected to the conductive connection element and partially received in the hollowed-out portion.

16. The light-emitting keyboard as claimed in claim 14, wherein a width of the through hole is equal to a width of the conductive connection element.

17. The light-emitting keyboard as claimed in claim 11, wherein the light guiding plate further comprises a receiving groove for receiving and limiting a movement of the flexible circuit board.

18. The light-emitting keyboard as claimed in claim 11, wherein the light blocking plate further comprises a light blocking zone and a light blocking element disposed within the light blocking zone, and the light blocking zone corresponds in position to the conductive connection element.

19. The light-emitting keyboard as claimed in claim 11, wherein the conductive connection element is formed by a reflow soldering process.

20. The light-emitting keyboard as claimed in claim 11, wherein the hollowed-out portion has a contour of a four-pointed star.

* * * * *